United States Patent
Ezrielev

(10) Patent No.: US 12,423,419 B2
(45) Date of Patent: Sep. 23, 2025

(54) SYSTEM AND METHOD FOR DETERMINING TYPES OF ANOMALIES WHILE PERFORMING MEMORY-LESS ANOMALY DETECTION

(71) Applicant: Dell Products L.P., Round Rock, TX (US)

(72) Inventor: Ofir Ezrielev, Be'er Sheva (IL)

(73) Assignee: Dell Products L.P., Round Rock, TX (US)

(*) Notice: Subject to any disclaimer, the term of this patent is extended or adjusted under 35 U.S.C. 154(b) by 81 days.

(21) Appl. No.: 18/157,271

(22) Filed: Jan. 20, 2023

(65) Prior Publication Data
US 2024/0248982 A1    Jul. 25, 2024

(51) Int. Cl.
| G06F 21/56 | (2013.01) |
| G06F 21/55 | (2013.01) |
| G06N 5/04  | (2023.01) |
| G06N 5/045 | (2023.01) |

(52) U.S. Cl.
CPC .......... *G06F 21/552* (2013.01); *G06N 5/045* (2013.01); *G06F 2221/034* (2013.01)

(58) Field of Classification Search
CPC ....... H04L 63/14; H04L 63/1425; G06N 5/04; G06N 5/045; G06F 21/552; G06F 2221/00; G06F 2221/034
USPC ...................................................... 726/22–23
See application file for complete search history.

(56) References Cited

U.S. PATENT DOCUMENTS

| 9,097,542 | B2* | 8/2015 | Morlock ............. G06F 11/3466 |
| 11,113,610 | B2* | 9/2021 | Green ...................... G06N 5/04 |
| 11,720,464 | B1 | 8/2023 | Ezrielev | |
| 12,182,670 | B1 | 12/2024 | Beauchesne | |
| 12,299,122 | B2* | 5/2025 | Ezrielev .................... G06N 5/04 |
| 2016/0226894 | A1 | 8/2016 | Lee | |
| 2019/0138423 | A1 | 5/2019 | Agerstam et al. | |
| 2019/0188065 | A1 | 6/2019 | Anghel | |
| 2020/0285737 | A1* | 9/2020 | Kraus ................. H04L 63/1425 |
| 2020/0293870 | A1 | 9/2020 | Isikdogan et al. | |
| 2020/0334578 | A1 | 10/2020 | Ikeda | |

(Continued)

OTHER PUBLICATIONS

Pang, Guansong, et al. "Deep Learning for Anomaly Detection: A Review", ACM Comput. Surv., vol. 1, No. 1, Article 1, Jan. 2020. arXiv:2007.02500v3 [cs.LG] Dec. 5, 2020. 36 pages.

(Continued)

*Primary Examiner* — Bharat Barot
(74) *Attorney, Agent, or Firm* — WOMBLE BOND DICKINSON (US) LLP

(57) ABSTRACT

Methods and systems for anomaly detection in a distributed environment are disclosed. To manage anomaly detection, a system may include an anomaly detector and one or more data collectors. The anomaly detector may detect anomalies in data and classify the anomalies based on magnitudes of anomalies and types of anomalies using an inference model. To perform anomaly detection, the inference model may generate an inference. The inference may include multiple dimensions and the multiple dimensions may be used to identify the type of anomaly in the data via comparison to a set of known inferences and associated types of anomalies. Different types of anomalies may be keyed to different action sets to mitigate the potential impact of each type of anomaly.

20 Claims, 10 Drawing Sheets

(56) References Cited

U.S. PATENT DOCUMENTS

| | | | |
|---|---|---|---|
| 2020/0364561 A1* | 11/2020 | Ananthanarayanan | H04L 63/1425 |
| 2021/0048994 A1 | 2/2021 | Yu | |
| 2021/0133607 A1 | 5/2021 | Stubbs | |
| 2021/0144211 A1* | 5/2021 | Schnieders | H04L 63/1425 |
| 2021/0182556 A1 | 6/2021 | Klug | |
| 2021/0203576 A1 | 7/2021 | Padfield | |
| 2022/0004921 A1 | 1/2022 | Balaraman | |
| 2022/0027083 A1 | 1/2022 | Zuolo | |
| 2022/0030019 A1 | 1/2022 | Neuvirth | |
| 2022/0172067 A1 | 6/2022 | Kang | |
| 2022/0188694 A1 | 6/2022 | Suzani | |
| 2022/0201490 A1 | 6/2022 | Sedjelmaci | |
| 2022/0374677 A1* | 11/2022 | Wang | G06N 3/08 |
| 2022/0382622 A1 | 12/2022 | Ye | |
| 2022/0391724 A1 | 12/2022 | Yoon | |
| 2022/0417274 A1 | 12/2022 | Madanahalli | |
| 2023/0004863 A1 | 1/2023 | Kanishima | |
| 2023/0162038 A1 | 5/2023 | Qi | |
| 2023/0164150 A1* | 5/2023 | Abrahamian | H04L 63/1425 726/23 |
| 2023/0169147 A1 | 6/2023 | Sivakumar | |
| 2023/0229550 A1 | 7/2023 | Zhao | |
| 2023/0289660 A1 | 9/2023 | Shi | |
| 2023/0325725 A1 | 10/2023 | Lester | |
| 2023/0385456 A1 | 11/2023 | Beauregard et al. | |
| 2023/0412627 A1 | 12/2023 | Szilagyi et al. | |
| 2024/0046152 A1 | 2/2024 | Lehmann | |
| 2024/0095906 A1 | 3/2024 | Gudovskiy | |
| 2024/0104201 A1 | 3/2024 | Makovoz | |
| 2024/0323218 A1* | 9/2024 | Ezrielev | H04L 63/1425 |

OTHER PUBLICATIONS

Finke, Thorben, et al. "Autoencoders for unsupervised anomaly detection in high energy physics", Institute for Theoretical Particle Physics and Cosmology (TTK), RWTH Aachen University, D-52056 Aachen, Germany. arXiv:2104.09051v1 [hep-ph] Apr. 19, 2021. 32 pages.

Nassif et al., "Machine Learning for Anomaly Detection: A Systematic Review", IEEE Access, 2021, vol. 9, pp. 78658-78700 (43 pages).

Nivarthi et al., "Towards Few-Shot Time Series Anomaly Detection with Temporal Attention and Dynamic Thresholding," 2023 International Conference on Machine Learning and Applications (ICMLA), p. 1444~P1450 (Year: 2023).

He et al., "Unsupervised Log Anomaly Detection Based on Pre-training", 2023 9th International Conference on Systems and Informatics (ICSAI), 6 pages (Year: 2023).

* cited by examiner

SYSTEM AND METHOD FOR DETERMINING TYPES OF ANOMALIES WHILE PERFORMING MEMORY-LESS ANOMALY DETECTION

FIELD

Embodiments disclosed herein relate generally to anomaly detection. More particularly, embodiments disclosed herein relate to systems and methods to reduce computing resource expenditure and increase data security while performing anomaly detection.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
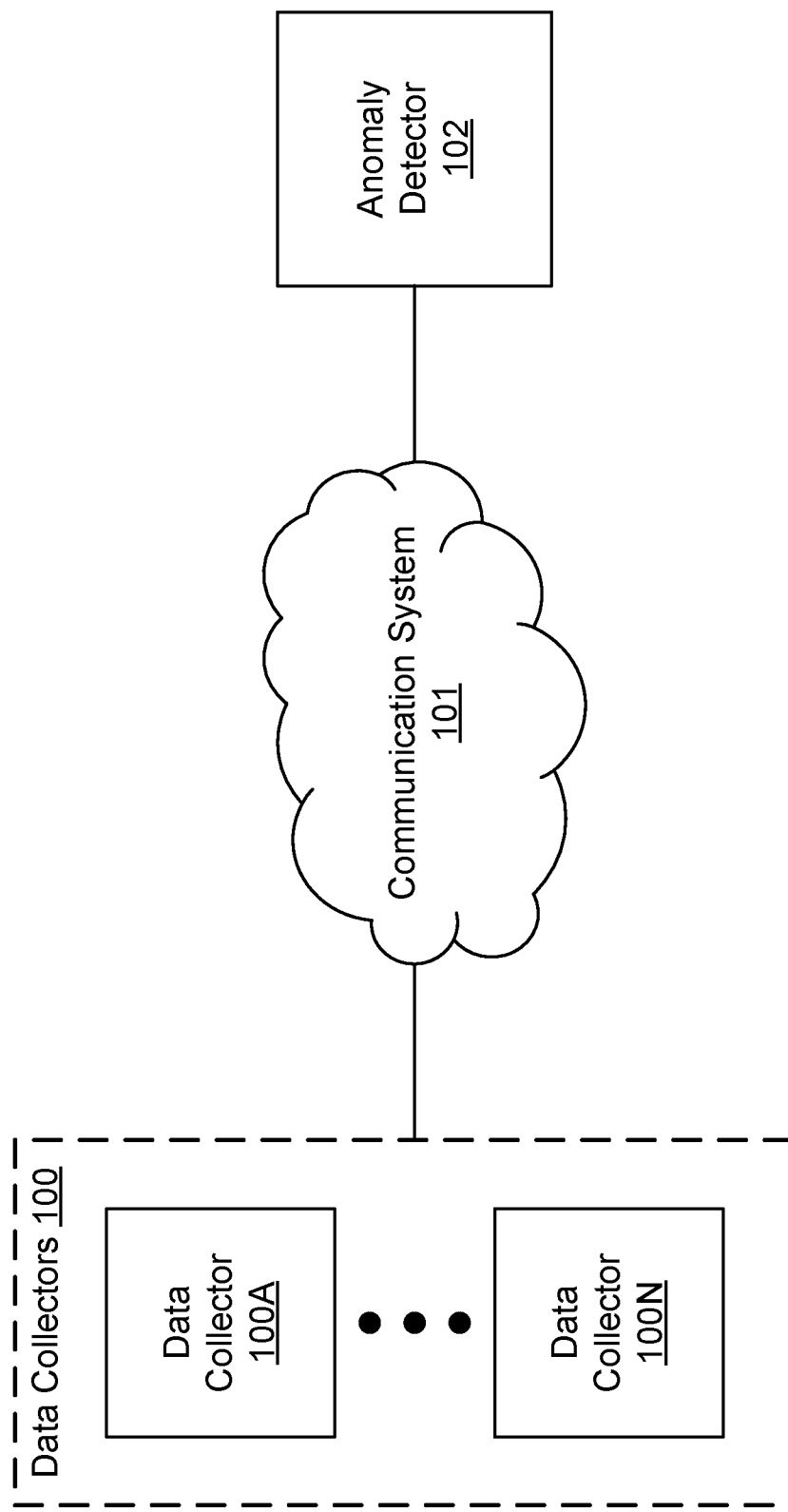
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for anomaly detection in a distributed environment using an inference model. To perform anomaly detection in a distributed environment, the system may include an anomaly detector. The anomaly detector may host and operate the inference model while re-training the inference model as needed. These operations (e.g., hosting, operating, and re-training the inference model) may consume large quantities of computing resources of a device (e.g., more computing resources than desirable and/or available to the device) and may, in some embodiments, require storage of large amounts of data on the device as training data. Storing large amounts of data on the device may leave the data vulnerable to malicious attacks by unauthorized entities (e.g., attackers who desire access to the data).

To bolster data security, the anomaly detector may re-train the inference model as needed (e.g., when input values do not generate a set of expected output values when non-anomalous) and subsequently discard (e.g., remove from the device) the data used to re-train the inference model. In addition, other data obtained from the one or more data collectors (e.g., data including anomalies and/or any other data not used to re-train the inference model) may also be discarded. By doing so, the anomaly detector may perform memory-less anomaly detection (e.g., detection of anomalies in data without maintaining data in any memory or storage device). Therefore, even in the event of an unauthorized entity (e.g., an attacker) gaining access to the device, the attacker may not access the data.

In addition, to reduce computing resource consumption during anomaly detection, the inference model may be trained to map input values to a fixed set of output values (e.g., via generating a multi-dimensional inference). By doing so, the inference model may perform unsupervised anomaly detection and, therefore, may reduce the quantity of computing resources required by the device to host and operate the inference model when compared to an anomaly detection algorithm requiring comparison of new data to existing (e.g., stored) data. Furthermore, re-training of the inference model may include a partial re-training process. Partial re-training of the inference model may include freezing (e.g., rendering unaffected by the re-training of the inference model) portions of the inference model. By doing so, only portions of the inference model not included in the frozen portion may be modified during the re-training process. Partial re-training of the inference model may utilize fewer computing resources (e.g., by only re-training a portion of the inference model rather than the entire inference model) than a complete re-training process.

Lastly, the quality of the computer-implemented services (e.g., an entity's ability to respond to anomalies in data and/or mitigate the potential impact of the anomalies) may depend on the anomaly detector's ability to classify anomalies during memory-less anomaly detection. By performing memory-less anomaly detection, the anomaly detector may assign an anomaly level to obtained data (e.g., representing an amount of deviation of a multi-dimensional inference from a set of fixed output values) and may compare the anomaly level to a series of thresholds to determine whether the data is anomalous (and, if so, the level of criticality of the anomaly). However, the quality of the computer-implemented services may be further improved by identifying the type of anomaly.

To do so, an identifier may be obtained for the inference, the identifier representing the magnitude and direction of deviation of the components of the multi-dimensional inference when compared to the set of fixed output values. The identifier may be used to classify the anomaly (e.g., via an anomaly lookup table, via cluster analysis, etc.). Different action sets may then be performed based on the identified type of anomaly in the obtained data.

Thus, embodiments disclosed herein may provide an improved system for performing anomaly detection while securing data desired by attackers and minimizing computing resource expenditure on devices within a distributed environment. The system may improve data security on devices by not locally storing any data, thereby rendering the data unavailable to attackers. In addition, the device hosting the inference model may perform a partial re-training process (when re-training is needed) and, therefore, may not update the entire inference model.

Rather than comparing data to a database of stored data to identify anomalies in data, the inference model may map non-anomalous data to a set of known fixed output values. The magnitude and direction of deviation of a multi-dimensional inference from a set of fixed output values may indicate a particular type of anomaly. Therefore, fewer computing resources may be required to identify and respond to different types of anomalies in obtained data.

In an embodiment, a method of processing data is provided. The method may include: obtaining an inference using an inference model and data obtained from a data collector, the inference being intended to match a set of fixed output values when the data is non-anomalous, and the inference comprising at least one dimension; making a first determination, based on the inference and an anomaly level threshold, regarding whether the data comprises anomalous data; in a first instance of the first determination in which the data comprises anomalous data; classifying the inference using a first schema to identify a type of anomaly presented by the data; and performing an action set based on the type of anomaly to manage a potential impact of an occurrence of the type of anomaly.

Making the first determination may include: obtaining a set of components of the inference, the set of components being based on the at least one dimension; obtaining an anomaly level of the data using the set of components and the set of fixed output values; making a second determination regarding whether the anomaly level exceeds the anomaly level threshold; and in a first instance of the second determination in which the anomaly level exceeds the anomaly level threshold: identifying the data as anomalous data.

Obtaining the anomaly level may include: obtaining a difference, the difference being based on the set of components and the set of fixed output values; and assigning the anomaly level of the data based on a magnitude of the difference and a second schema for identifying a degree of anomalousness of the data.

Obtaining the difference may include: obtaining a first magnitude of a first component of the set of components; obtaining a set of magnitudes, the set of magnitudes comprising the first magnitude; obtaining a first fixed output value of the set of fixed output values, the first fixed output value corresponding to the first component; obtaining a first difference using the first fixed output value and the first component; obtaining a set of differences, the set of differences comprising the first difference; and treating the set of differences as the difference.

Classifying the inference may include: obtaining an identifier using the set of components; and identifying, using the first schema and the identifier, the type of anomaly.

Obtaining the identifier may include: obtaining a first direction of deviation based on the first fixed output value and the first component; obtaining a set of directions of deviation using, at least in part, the first direction of deviation; and obtaining the identifier using the set of directions of deviation and the difference.

Identifying the type of anomaly may include: obtaining an anomaly lookup table, the anomaly lookup table comprising a listing of identifiers, and each identifier of the listing of identifiers being associated with a corresponding type of anomaly; and performing a lookup process using the anomaly lookup table and the identifier as a key for the anomaly lookup table to obtain the type of anomaly.

Identifying the type of anomaly may include: obtaining a set of clusters, each cluster in the set of clusters being associated with: a historical inference, the historical inference being obtained prior to obtaining the inference; and a type of anomaly; making a third determination regarding whether the inference falls within a cluster of the set of clusters; in a first instance of the third determination in which the inference falls within a cluster of the set of clusters: identifying the type of anomaly based on the cluster.

Performing the action set may include one selected from a group of actions consisting of: notifying a downstream consumer of the type of anomaly; initiating a process keyed to the type of anomaly; and logging the type of anomaly in storage.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include any type and quantity of computer-implemented services. For example, the computer-implemented services may include monitoring services (e.g., of locations), communication services, and/or any other type of computer-implemented services.

To provide memory-less anomaly detection services, the system may include anomaly detector 102. Anomaly detector 102 may provide all, or a portion of, the computer-implemented services. For example, anomaly detector 102 may provide computer-implemented services to users of anomaly detector 102 and/or other computing devices operably connected to anomaly detector 102. The computer-implemented services may include any type and quantity of services including, for example, memory-less anomaly detection.

To facilitate memory-less anomaly detection, the system may include one or more data collectors 100. Data collectors 100 may include any number of data collectors (e.g., 100A-100N). For example, data collectors 100 may include one data collector (e.g., 100A) or multiple data collectors (e.g., 100A-100N) that may independently and/or cooperatively facilitate the memory-less anomaly detection.

All, or a portion, of the data collectors 100 may provide (and/or participate in and/or support the) computer-implemented services to various computing devices operably connected to data collectors 100.

The computer-implemented services may include any type and quantity of services including, for example, memory-less anomaly detection in a distributed environment. Different data collectors may provide similar and/or different computer-implemented services.

When providing the computer-implemented services, the system of FIG. 1 may determine an anomaly level of the data, with data having an anomaly level outside an anomaly level threshold being treated as anomalous data and data having an anomaly level within the anomaly level threshold being treated as non-anomalous data. Anomalous data may be further categorized based on the anomaly level of the data to indicate a magnitude of anomaly (e.g., the degree of criticality of the anomaly, etc.). To do so, the system of FIG. 1 may utilize an inference model that generates inferences (e.g., multi-dimensional outputs) usable to determine the anomaly level of the data and, therefore, ascertain whether the data is anomalous.

However, the quality of the computer-implemented services may depend on how well the system of FIG. 1 is able to ascertain whether data is anomalous. The inference model may be trained to map non-anomalous input values to a set of fixed output values (e.g., a set of numbers other than zero). When encountering new data, the inference model may map non-anomalous data (previously unseen by the inference model during training or otherwise) to a set of output values other than the expected set of output values. To improve the anomaly detection capabilities of the inference model (so it is able to identify new non-anomalous data as non-anomalous), the inference model may be re-trained to obtain an updated inference model. However, hosting, operating, and re-training of the inference model may consume large quantities of computing resources (e.g., more computing resources than desirable for use by the device), may require large amounts of data to be stored on a device (e.g., training data and/or other data), and storing large amounts of data on the device may also leave the data vulnerable to malicious attacks by third parties (e.g., attackers who desire access to the data).

In addition, an entity (e.g., a downstream consumer) may wish to respond differently based on the type of anomaly detected. Therefore, simply identifying an anomaly in data may not provide sufficient detail to meet the needs of the entity.

In general, embodiments disclosed herein may provide methods, systems, and/or devices for minimizing computing resource expenditure by devices in a distributed environment while identifying types and levels of criticality of anomalies in data while continuously updating inference models. To minimize computing resource expenditure during anomaly detection in data (and protect data from malicious attackers that may attempt to compromise devices storing copies of the data), the system of FIG. 1 may implement an inference model update framework and anomaly detection framework that allows (i) small amounts of data to be used for training and discarded thereby not requiring large amounts of data to be aggregated for training purposes, and (ii) data processed for anomaly detection purposes to be discarded after processing likewise reducing the amount of data subject to compromise by malicious attackers. The inference model utilized for anomaly detection may be trained to map input data to a set of output values and, therefore, may reduce storage requirements during inference generation due to the unsupervised nature of the inference model.

In addition, the inference model update framework may update inference models through a partial re-training process. Partial re-training of the inference model may utilize fewer computing resources (e.g., by only re-training a portion of the inference model rather than the entire inference model) than a complete re-training process.

To provide its functionality, the system of FIG. 1 may include anomaly detector 102. Anomaly detector 102 may (i) identify an anomaly level of data (e.g., obtained from data collectors 100 and/or by itself) using an inference model, (ii) determine whether data is anomalous using the anomaly level and an anomaly level threshold, (iii) classify (when anomalous data is identified) the inference using a schema for identifying a type of anomaly presented by the data, (iv) perform an action set based on the type of anomaly to manage a potential impact of an occurrence of the type of anomaly, and/or (v) discard the data after its use so that the data is not available to malicious attackers if anomaly detector 102 is compromised.

The anomaly level of the data may be identified based on a difference between the inference generated by the inference model and the set of fixed output values expected if the data is non-anomalous (e.g., a previously established set of numbers that are not zero). An anomaly level outside an anomaly level threshold may indicate the presence of anomalous data.

To classify the inference, a set of components of the inference may be obtained using the inference (e.g., due to the inference being a multi-dimensional inference). The set of components may be compared to a database of known types of anomalies and corresponding sets of components to determine the type of anomaly associated with the data.

For example, a system may collect temperature and pressure data over time in an industrial environment. Types of anomalies that may occur in the industrial environment may include: (i) high temperature, (ii) high pressure, (iii) low temperature, (iv) low pressure, and/or (v) other types of anomalies. The inference obtained using the inference model may include multiple dimensions and, therefore, a set of components. The set of components may include, for example, an array of numbers such as [1, 0.9, 1.2]. The magnitude and direction of deviation between the set of components and the set of fixed output values (e.g., [1, 1, 1]) may be used to identify the type of anomaly associated with the data. Although the inference is described herein as including more than one dimension (e.g., as an inference with multiple dimensions and/or a multi-dimensional inference), it should be appreciated that the inference may include one dimension without departing from embodiments disclosed herein.

When performing its functionality, anomaly detector 102 and/or data collectors 100 may perform all, or a portion, of the methods and/or actions shown in FIGS. 3A-4C.

Data collectors 100 and/or anomaly detector 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data collectors 100 and/or anomaly detector 102 are implemented using an internet of things (IoT) device, which may include a computing device. The IoT device may operate in accordance with a communication model and/or management model known to the anomaly detector 102, other data collectors, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Figure 2:
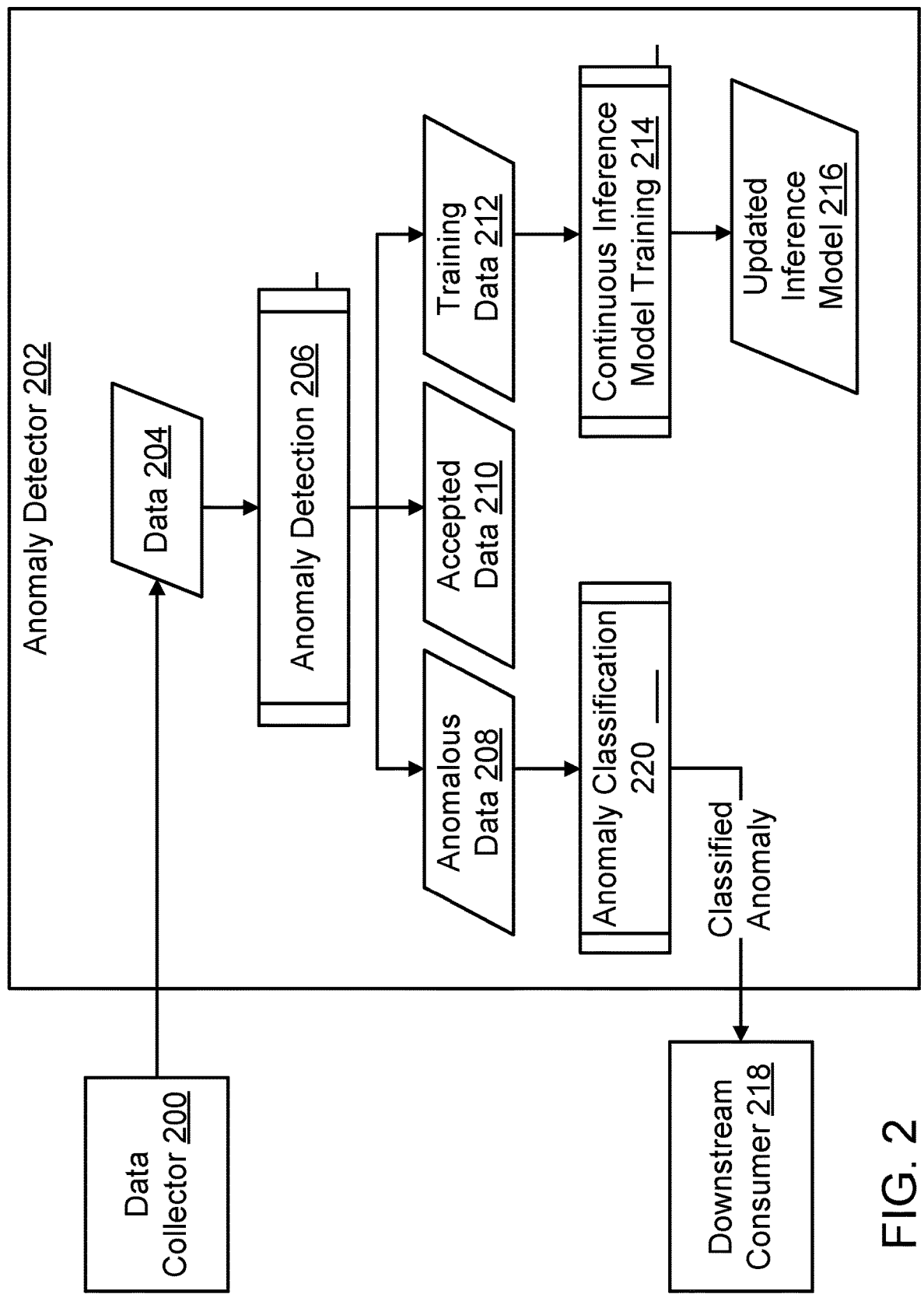
FIG. 2 shows a block diagram illustrating an anomaly detector over time in accordance with an embodiment.

To further clarify embodiments disclosed herein, diagrams illustrating data flows and/or processes performed in a system in accordance with an embodiment are shown in FIG. 2.

FIG. 2 shows a diagram of anomaly detector 202 interacting with data collector 200 and downstream consumer 218. Anomaly detector 202 may be similar to anomaly detector 102 shown in FIG. 1. In FIG. 2, anomaly detector 202 may be connected to data collector 200 and downstream consumer 218 via a communication system (not shown). Data collector 200 may be similar to any of data collectors 100. Communications between anomaly detector 202, data collector 200, and downstream consumer 218 are illustrated using lines terminating in arrows. In some embodiments, downstream consumer 218 may not be required.

As discussed above, anomaly detector 202 may perform computer-implemented services by processing data (e.g., via memory-less anomaly detection) in a distributed environment in which devices may be subject to malicious attacks.

To perform memory-less anomaly detection in the distributed environment, anomaly detector 202 may obtain data 204 from data collector 200. Data 204 may include any type and quantity of data. Anomaly detector 202 may perform anomaly detection 206 process on data 204 to determine whether data 204 includes anomalous data. Anomaly detection 206 process may include generating an inference (e.g., a multi-dimensional output) using an inference model trained to map non-anomalous data to a set of fixed output values (e.g., a set of numbers that are not zero). A set of components of the inference may be obtained based on the multiple dimensions of the inference. Anomaly detector 202 may generate a difference. The difference may be based on the set of components and the set of fixed output values. Anomaly detector 202 may determine an anomaly level of the data based on the difference and a schema for identifying a degree of anomalousness of the data. The schema may categorize the data into one of a plurality of anomaly levels based on difference ranges corresponding to the anomaly levels. The anomaly detector 202 may determine whether the anomaly level of the data is outside an anomaly level threshold. The anomaly level threshold may indicate a first range of anomaly levels. Any anomaly level outside the anomaly level threshold may indicate that the inference does not sufficiently match the fixed output value and, therefore, includes anomalous data. Any anomaly level within the anomaly level threshold may indicate that the data does not include anomalous data. The anomaly level threshold may be set by a downstream consumer 218, and any data outside the anomaly threshold may be considered unacceptable for the needs of downstream consumer 218. Therefore, downstream consumer 218 may desire to be notified of any anomalies in collected data. In some embodiments, anomaly detector 202 may respond directly to any anomalies and downstream consumer 218 may not be included in the system. Anomaly detector 202 may perform different actions with respect to data 204 depending on whether data 204 includes anomalous data. If data 204 is anomalous, anomaly detector 202 may perform different actions depending on the type of anomaly assigned to data 204.

In a first example of the actions that anomaly detector 202 may take, consider a scenario in which the anomaly level is outside the anomaly level threshold and, therefore, may include anomalous data 208. When data 204 is classified as anomalous data 208, anomaly detector 202 may perform anomaly classification 220 process to identify a type of anomaly associated with data 204. Anomaly classification 220 process may include obtaining an identifier associated with data 204 and identifying the type of anomaly associated with data 204 using the identifier and first schema for identifying a type of anomaly presented by the data. The identifier may include a set of magnitudes of deviation and a set of directions of deviation of the components of the inference when compared to the set of fixed output values.

The schema for identifying a type of anomaly may include performing a lookup in an anomaly lookup table using the identifier as a key for the anomaly lookup table. The anomaly lookup table may include a listing of identifiers and each identifier of the listing of identifiers may be associated with a corresponding type of anomaly. Additionally, the schema for identifying a type of anomaly may include comparing the inference to a set of clusters, each cluster in the set of clusters being associated with: (i) a historical inference, the historical inference being obtained prior to the inference, and (ii) a type of anomaly. A cluster analysis may be performed using the inference and the set of clusters to determine whether the inference falls within a cluster of the set of clusters.

Anomaly classification 220 process may generate a classified anomaly and the classified anomaly may be transmitted to downstream consumer 218. Downstream consumer 218 (and/or anomaly detector 202) may perform an action set keyed to the type of anomaly identified by the classified anomaly. The action set may include sending the anomalous data 208 (and/or a notification of the type of anomaly present in data 204) to downstream consumer 218, initiating a process keyed to the type of anomaly, logging the type of anomaly in storage, (and/or other actions including, for example, re-training the inference model).

Therefore, the action set may include sending the anomalous data 208 (and/or a notification of the presence of anomalies in data 204) and may also include an additional action (e.g., alerting a security team, closing a security door, initiating a fire suppressant system, initiating an extensive analysis of the inference model, etc.) to interfere with the anomaly. Alternatively, anomaly detector 202 itself may perform the action set based on the presence of anomalous data 208. In this example, downstream consumer 218 may or may not be included in the system. Following this action set, anomalous data 208 may be discarded, transmitted to another device, and/or otherwise removed from anomaly detector 202. By doing so, anomalous data 208 may not be available to malicious attackers if anomaly detector 202 is compromised.

In a second example of the actions that anomaly detector 202 may take, consider a scenario in which the anomaly level is within the anomaly level threshold. When data 204 is classified as not including anomalous data, anomaly detector 202 may elect to use data 204 for training purposes if useful for training. To ascertain whether data 204 is useful for training, the anomaly level may be compared to a calibration threshold. The calibration threshold may indicate a second range of anomaly levels. Any anomaly level outside the calibration threshold (but within the anomaly level threshold) may indicate that data 204 is useful for training purposes and may be classified as training data 212. Any anomaly level within the calibration threshold may indicate that data 204 is not useful for training purposes.

Continuing with the second example, if the anomaly level is within the calibration threshold, then data 204 may be classified as accepted data 210. Accepted data 210 may be treated as not including anomalies and not useful for training (at least with respect to the level of improvement in the inference model that could be attained by training using accepted data 210 when weighed against the computing resource cost for the training). Accepted data 210 may be discarded, transmitted to another device, and/or otherwise removed from anomaly detector 202 so that, like anomalous data 208, accepted data 210 may not be available to malicious attackers should anomaly detector 202 be compromised.

When identified, training data 212 may be used for a continuous inference model training 214 process. Continuous inference model training 214 process may include a partial re-training of the inference model. Partial re-training of the inference model may include freezing (e.g., rendering unaffected by the re-training) a portion of the inference model. Therefore, only portions of the inference model not included in the frozen portion of the inference model may be modified during re-training. Partial re-training of the inference model may consume fewer computing resources than a complete re-training of the inference model, may reduce large changes in decisions boundaries of the inference model, and may facilitate discarding of data on a piece meal basis (e.g., by avoiding the need for establishing large training data sets through aggregation of large amounts of data that may be valued by a malicious attacker).

Continuous inference model training 214 process may generate an updated inference model 216 (e.g., by modifying the structure of the inference model). Updated inference model 216 may be used to generate inferences that better discover anomalies given a changed environment that is now considered non-anomalous. Following continuous inference model training 214 process, training data 212 may be discarded, transmitted to another device, and/or otherwise removed from anomaly detector 202 so that training data 212 may not be available to malicious attackers through compromise of anomaly detector 202.

By discarding all data (e.g., anomalous data 208, accepted data 210, and training data 212), no data may be stored on anomaly detector 202 for any significant duration of time. Therefore, malicious attackers attempting to compromise anomaly detector 202 may not be able to access any significant quantity of data in the event of an attack. Therefore, anomaly detection may be performed by anomaly detector 202 with improved security through continuous inference model updating and discarding of the data. In addition, by only performing partial re-training of the inference model, fewer computing resources may be consumed to update the inference model. Lastly, by assigning anomaly levels to the data, data corresponding to different anomaly levels (and, therefore, different degrees of anomalousness) may be keyed to different action sets (depending, for example, on the criticality of the anomaly to the operation of the downstream consumer). Therefore, the memory-less anomaly detection may allow for tailored action sets to be initiated depending on the anomaly level associated with the data (if the data has an anomaly level outside the anomaly level threshold and, therefore, may be categorized as anomalous data).

In an embodiment, anomaly detector 202 is implemented using a processor adapted to execute computing code stored on a persistent storage that when executed by the processor performs the functionality of anomaly detector 202 discussed throughout this application. The processor may be a hardware processor including circuitry such as, for example, a central processing unit, a processing core, or a microcontroller. The processor may be other types of hardware devices for processing information without departing from embodiments disclosed herein.

Figure 3A:
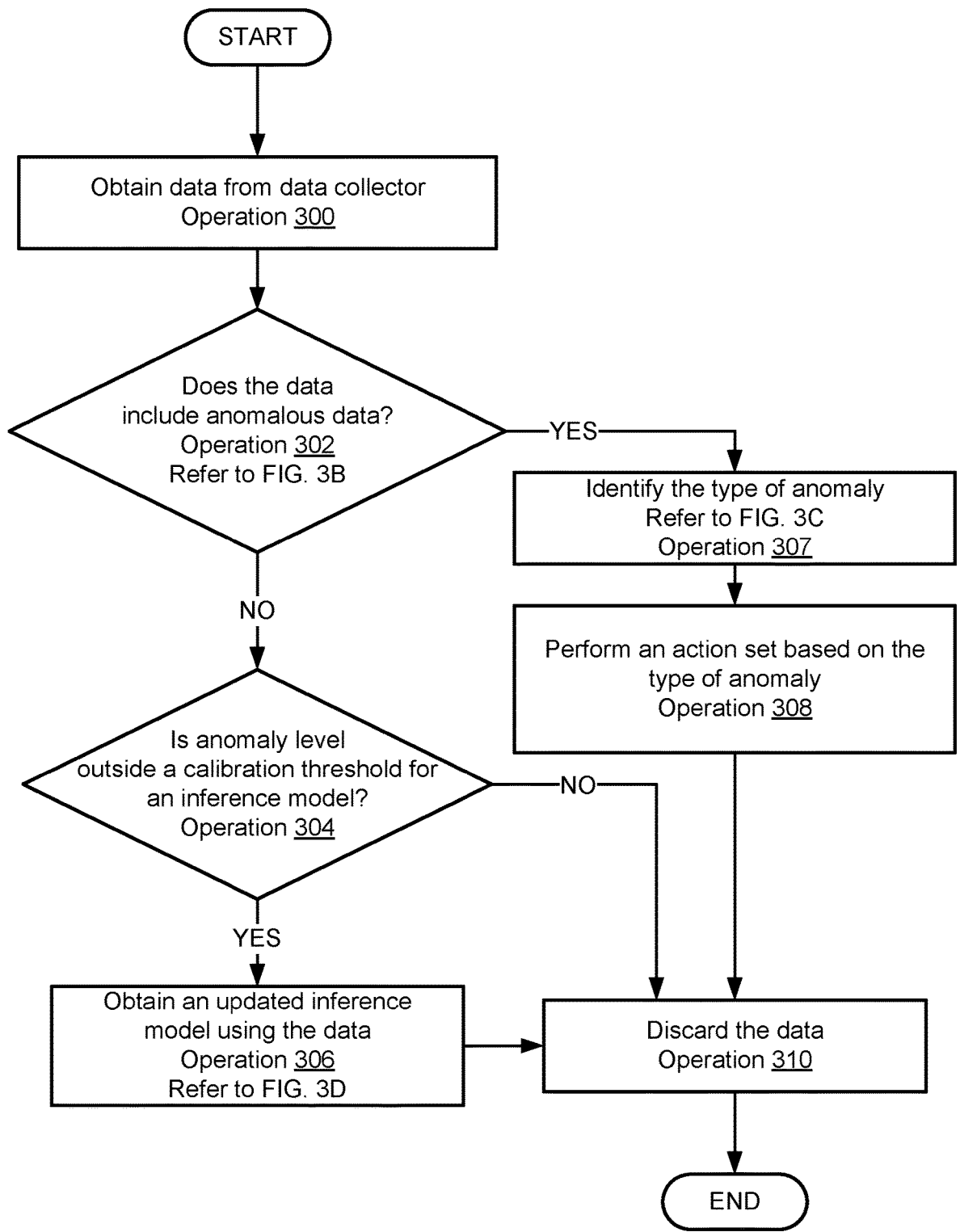
FIG. 3A shows a flow diagram illustrating a method of anomaly detection using an inference model in accordance with an embodiment.
Figure 3B:
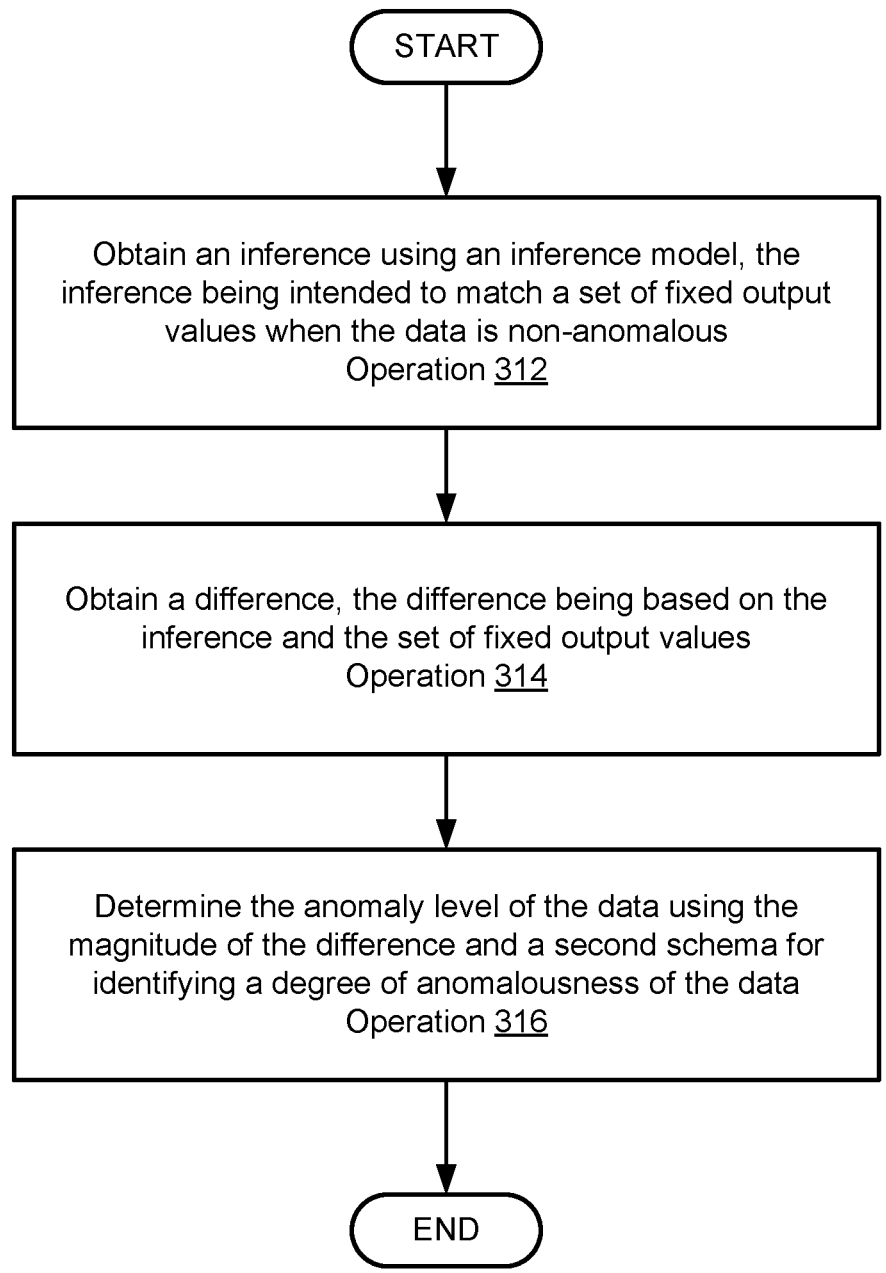
FIG. 3B shows a flow diagram illustrating a method of identifying anomalous data in accordance with an embodiment.
Figure 3C:
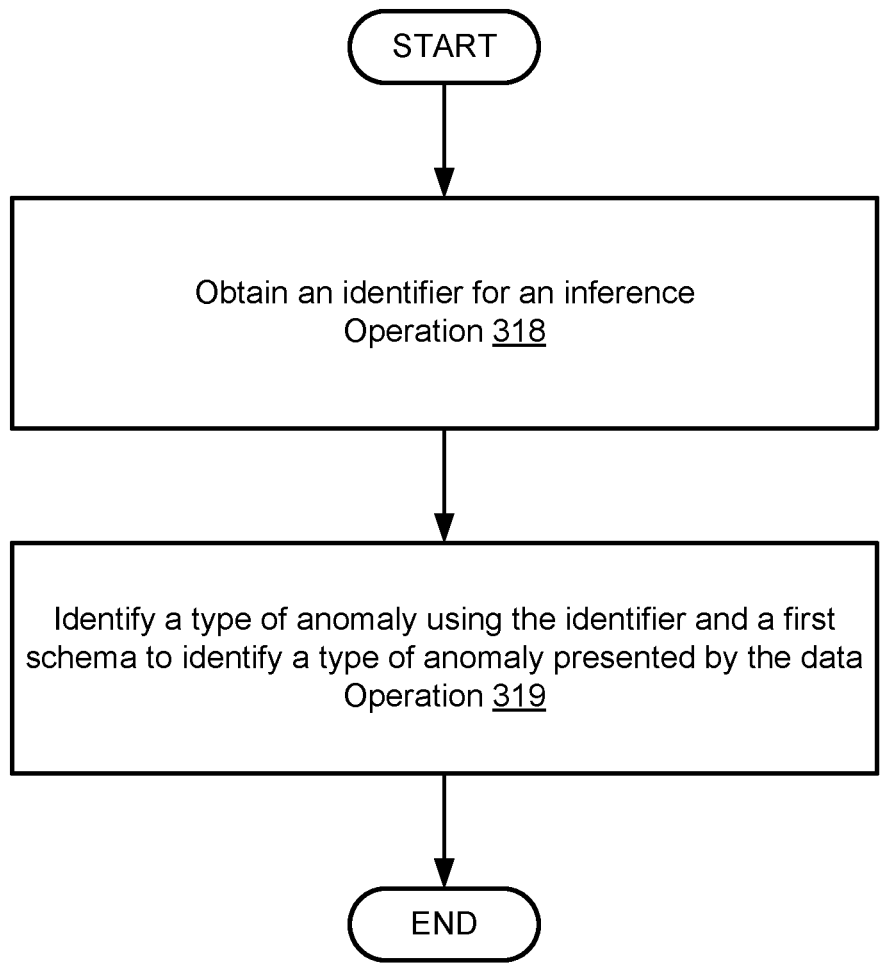
FIG. 3C shows a flow diagram illustrating a method of identifying a type of anomaly in accordance with an embodiment.

As discussed above, the components of FIG. 1 may perform various methods to perform anomaly detection in a distributed environment in which devices may be subject to malicious attacks. FIGS. 3A-3C illustrate methods that may be performed by the components of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method of anomaly detection using an inference model in accordance with an embodiment is shown. The method may be performed, for example, by an anomaly detector, a data collector, and/or another device.

At operation 300, data is obtained from a data collector. The data collector may be any device (e.g., a data processing system) that collects data. For example, the data collector may include a sensor that collects data (e.g., temperature data, humidity data, or the like) representative of an ambient environment, a camera that collects images and/or video recordings of an environment, and/or any other type of component that may collect information about an environment or other source.

The obtained data may include the live data (e.g., temperature readings, video recordings, etc.), aggregated statistics and/or other representation of the data (e.g., an average temperature, portions of the video, etc.) to avoid transmitting large quantities of data over communication system 101, and/or any other types of information.

The data may be obtained from data collectors 100 continuously, at regular intervals, in response to a request from anomaly detector 102, and/or in accordance with any other type of data collection scheme. For example, data collector 100A may include a temperature sensor that records temperature measurements of a reagent during a chemical synthesis process in an industrial environment. The ones responsible for managing the chemical synthesis process may wish to be notified if the temperature of the reagent goes above or below an acceptable range. Following receipt of the data, the anomaly detector 102 may determine whether the data includes anomalous data as described below. In some embodiments, the data collectors 100 and anomaly detector 102 may be integrated into a single device.

At operation 302, the anomaly detector 102 determines whether the data includes anomalous data. Anomalous data may be data that deviates from typical data by a certain degree. Anomalous data may include, for example, a temperature measurement taken at a certain time during a chemical synthesis process that is unexpectedly high or low. For additional details regarding anomaly detection, refer to FIG. 3B.

If the data includes anomalous data, the method may proceed to operation 307. If the data does include anomalous data, the method may proceed to operation 304.

At operation 307, the type of anomaly is identified. Identifying the type of anomaly may include: (i) obtaining an identifier for an inference obtained using an inference model and data obtained from a data collector, and/or (ii) identifying the type of anomaly using the identifier and a first schema to identify a type of anomaly presented by the data. Refer to FIG. 3C for additional details regarding identifying the type of anomaly.

At operation 308, an action set is performed based on the type of anomaly. Data with different types of anomalies may trigger different action sets. For example, performing the action set may include: (i) notifying a downstream consumer of the type of anomaly, (ii) initiating a process keyed to the type of anomaly, (iii) logging the type of anomaly in storage, and/or (iv) other actions. The action sets may be further based on the anomaly level (e.g., a critical high pressure anomaly, a non-critical high pressure anomaly, etc.).

Notifying the downstream consumer of the type of anomaly may include transmitting one or more messages (e.g., an email alert, a text message alert, an alert through an application on a device) to the downstream consumer. The messages may include information (e.g., that the data is anomalous and the type of anomaly) regarding the data, a copy of the data itself, and/or other information.

Initiating a process keyed to the type of anomaly may include: (i) identifying the process keyed to the type of anomaly (e.g., via performing a lookup in a process lookup table, via reading the process from storage, etc.), (ii) notifying an entity responsible for performing the process to initiate the process.

The anomaly detector (and/or another entity responsible for maintaining a log of anomalies) may log the type of anomaly in storage. Logging the type of anomaly in storage may include generating a data structure including: (i) the type of anomaly, (ii) a timestamp of the occurrence of the anomaly, (iii) the inference associated with the anomaly, (iv) any action taken to mitigate the impact of the anomaly, and/or (v) other information.

At operation 310, the data is discarded. The data may be discarded to secure against data being accessed by a malicious attacker attempting to compromise an anomaly detector. The data may be discarded immediately following the action set described in operation 308, and/or may be discarded after a previously determined duration of time (e.g., twice per day, etc.).

Discarding data may include deleting the data, transmitting the data to a device at an offsite location to be archived, and/or transmitting the data to another device for other purposes (in net, resulting in no copies of the data being retained on the anomaly detector). The data may be discarded via other methods without departing from embodiments disclosed herein. By doing so, any unauthorized entity (e.g., a malicious attacker) gaining access to the anomaly detector 102 via a malicious attack would not be able to access any data (e.g., due to the data not being stored in any memory or storage on the compromised device).

Returning to operation 302, the method may proceed to operation 304 if the data does not include anomalous data. If the data does not include anomalous data, the data may (or may not) be useful to evaluate and/or improve the inference model through training, as described below.

At operation 304, it is determined whether the anomaly level is outside a calibration threshold for an inference model used to generate the inference to evaluate whether the data includes anomalous data in operation 302. An anomaly level within the calibration threshold may indicate that the inference model reliably maps non-anomalous data to a previously established fixed output value (e.g., a number that is not zero). Data within the calibration threshold may indicate, for example, that the inference model meets the requirements of a downstream consumer. An anomaly level outside the calibration threshold (but within the anomaly level threshold) may indicate that the inference model is not accurate enough to meet the requirements of the downstream consumer (or may otherwise be improved using the data to a significant enough degree that it outweighs the computing resource cost for updating the inference model). If the anomaly level is within the calibration threshold, the inference model may not use the data for training, and the data may be discarded as described with respect to operation 310 below. If the anomaly level is outside the calibration threshold, the method may proceed to operation 306 and the inference model may be use for training to obtain an updated inference model. Refer to FIG. 2 for additional details regarding the calibration threshold.

At operation 306, an updated inference model is obtained using the data. To obtain an updated inference model, the anomaly detector may treat the data as training data and may re-train the inference model to obtain the updated inference model. The retraining may be partial retraining where only the data is used to update the inference model. The updated inference model may be more likely to map new non-anomalous data to the previously established fixed output value for non-anomalous data than the inference model. Following re-training of the inference model, the data may be discarded as described with respect to operation 310. Refer to FIG. 3C for additional details regarding obtaining an updated inference model.

The method may end following operation 310.

Using the method illustrated in FIG. 3A, a system in accordance with embodiments disclosed herein may provide for anomaly detection and the performance of action sets tailored to the type of anomaly with a continuously updated inference model while reducing the risk of undesired disclosure of data to malicious attackers.

Turning to FIG. 3B, a flow diagram illustrating a method of identifying anomalous data in accordance with an embodiment is shown. The operations in FIG. 3B may be an expansion of operation 302 in FIG. 3A.

At operation 312, an inference is obtained using an inference model. The inference may be intended to map to a set of previously established fixed output values (within a threshold) when the data is non-anomalous. The inference may include multiple dimensions and a set of components of the inference may be obtained based on the multiple dimensions. The set of components of the inference may be obtained by obtaining a listing of the values associated with the multiple dimensions and treating the listing of the values as the set of components of the inference.

Figure 4A:
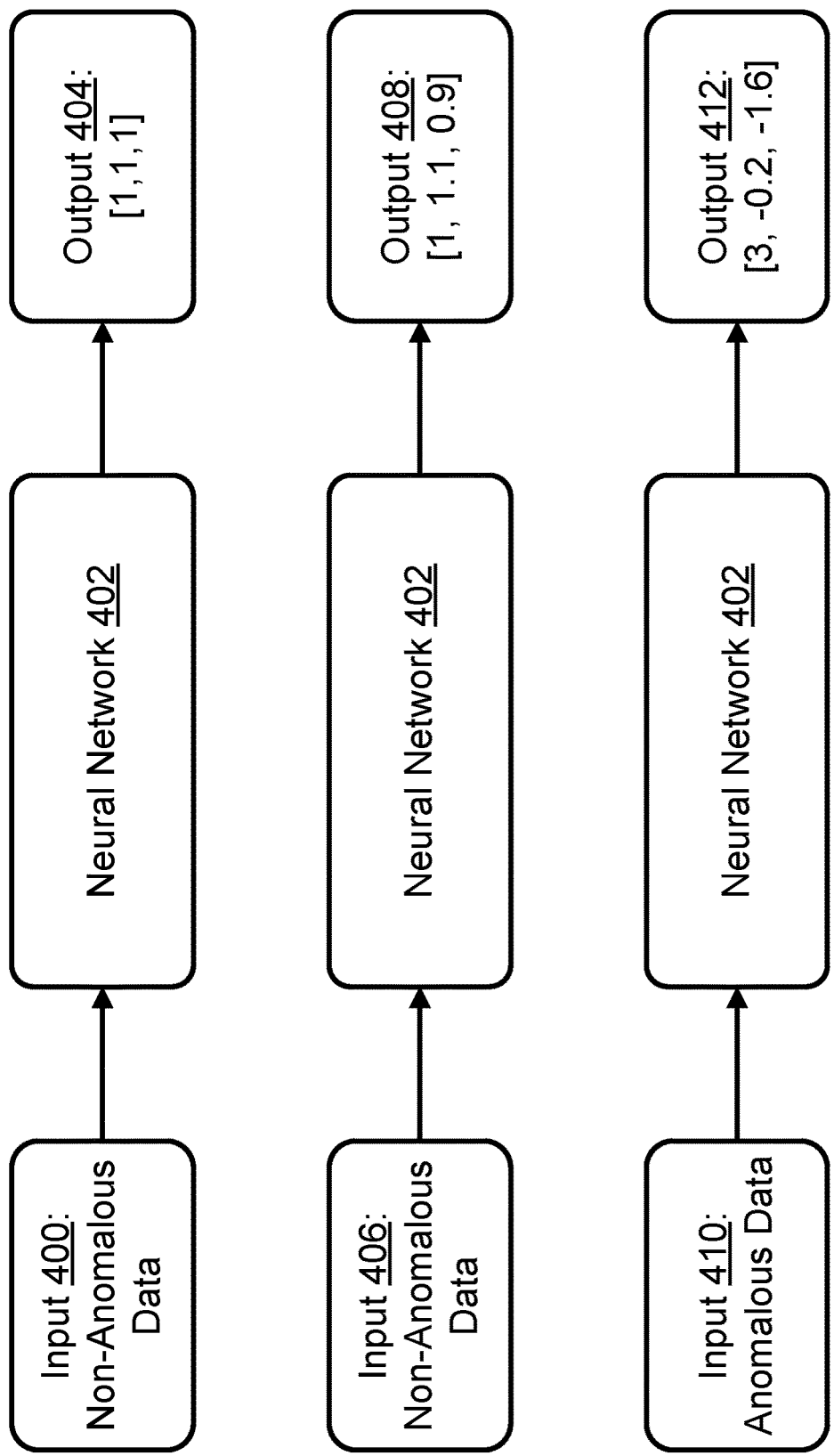
FIG. 4A shows a diagram illustrating an example neural network in accordance with an embodiment.

The inference model may be, for example, a machine learning model (e.g., a neural network) and/or any other type of predictive model trained to generate inferences based on data obtained from data collectors 100. Refer to FIG. 4A for additional details regarding the inference model. The inference model may be trained using anomaly detection training data (not shown) to obtain an initially trained model. Anomaly detection training data may include a labeled dataset of data (e.g., including both anomalous and non-anomalous data) or may be unlabeled.

For example, the anomaly detection training data may include sets of temperature data obtained from a temperature sensor in an industrial environment and sets of pressure data obtained from a pressure sensor in the same industrial environment. The temperature sensor and the pressure sensor may be intended to monitor conditions during a chemical synthesis process. Certain temperature and pressure values (and/or temperature and pressure ranges) may be considered non-anomalous. Therefore, the inference model may be trained to generate a set of fixed output values (e.g., an array of ones or any other value that is not zero) when the temperature and pressure values are non-anomalous (e.g., within the accepted ranges). The inference model may generate an inference (e.g., an array of values) that does not match the set of fixed output values when the temperature and/or pressure data is anomalous. The inference may be used in conjunction with the set of fixed output values to determine a level of anomalousness and, therefore, whether an anomaly is present in the data.

At operation 314, a difference is obtained, the difference being any reduced-size representation of data based on the inference and the set of fixed output values. The difference may be represented as a value difference, a percent difference, and/or any other representation of the difference between the inference and the set of fixed output values.

Obtaining the difference may include: (i) obtaining a first magnitude of a first component of the set of components, (ii) obtaining a set of magnitudes using the first magnitude, (iii) obtaining a first fixed output value of the set of fixed output values, (iv) obtaining a first difference using the first fixed output value and the first component, (v) obtaining a set of differences, and/or (vi) treating the set of differences as the difference.

To obtain the first magnitude, the set of components of the inference may be obtained. The first component of the set of components may be obtained by selecting the first component at random, selecting the first component from an ordered list, and/or selecting the first component via another method. The first component may be a number including both a magnitude and a direction. The first magnitude may be the magnitude associated with the first component. The first magnitude may be obtained by requesting the first magnitude from another entity responsible for obtaining and managing the set of components. The first magnitude may also be read from storage (locally or off-site).

The set of magnitudes may include the first magnitude and any number of additional magnitudes based on the number of components of the inference. To obtain the set of magnitudes, the set of magnitudes may be generated generating a data structure and adding the first magnitude to the data structure. Additional magnitudes may be obtained and added to the set of magnitudes. The set of magnitudes may also be obtained by requesting the set of magnitudes from another entity or reading the set of magnitudes from storage (locally or off-site).

To obtain the first fixed output value, the set of fixed output values may be obtained (e.g., from storage, from another entity, etc.). Each fixed output value in the set of fixed output values may correspond to a component of the set of components. The first fixed output value may be obtained by identifying a fixed output value that corresponds to the first magnitude. The first fixed output value may also be obtained by requesting the first fixed output value from another entity and/or may be read from storage (locally or off-site).

To obtain the first difference, the first output value may be compared to the first component. The first difference may be obtained by subtracting a numerical value of the first output value from a numerical value of the first component. The first difference may be obtained via other operations and methods without departing from embodiments disclosed herein. The first difference may also be requested from another entity responsible for obtaining differences and/or may be read from storage (locally or off-site).

The set of differences may be obtained by generating the set of differences. To generate the set of differences, the first difference may be added to a data structure intended to include any number of differences. Additional differences may be obtained (via generating the additional differences and/or via requesting the additional differences from another entity) and added to the data structure. The set of differences may also be obtained by requesting the set of differences from another entity responsible for generating, managing, and/or storing the set of differences.

The set of differences may be treated as the difference by labeling the data structure associated with the set of differences as the difference. Treating the set of differences as the difference may also include generating instructions for locating and accessing the set of differences and storing the instructions along with the difference.

At operation 316, the anomaly level of the data may be determined using the magnitude of the difference and a second schema for identifying a degree of anomalousness of the data. The second schema may categorize the data into one of a plurality of anomaly levels based on difference ranges corresponding to anomaly levels. The categorization may be made by identifying which of the difference ranges in which a magnitude of the difference resides. The difference ranges corresponding to the anomaly levels may be non-overlapping, and in aggregate, the difference ranges may encompass a full range over which the magnitude of the difference may range. Specifically, as the value of the anomaly level increases, the degree of anomalousness (e.g., and therefore the magnitude of deviation from the inference) of the data may increase.

The method may end following operation 316.

Turning to FIG. 3C, a flow diagram illustrating a method of identifying a type of anomaly in accordance with an embodiment is shown. The operations in FIG. 3C may be an expansion of operation 307 in FIG. 3A.

At operation 318, an identifier for an inference is obtained. The identifier may be obtained by: (i) obtaining a first direction of deviation based on the first fixed output value and the first component of the set of components of the inference, (ii) obtaining a set of directions of deviation, and/or (iii) obtaining the identifier using the set of directions of deviation and the difference.

Obtaining the first direction of deviation may include: (i) obtaining the set of components of the inference (e.g., a set of numerical values), (ii) identifying a first component of the set of components, (iii) comparing the first component to a first fixed output value of the set of fixed output values (e.g., a numerical value that is not zero) to obtain a first direction of deviation. For example, the first component may be −0.4 and the first fixed output value may be 1. Therefore, the first direction of deviation may be negative.

Obtaining the set of directions of deviation may include: (i) adding the first direction of deviation to a listing of directions of deviation, and/or (ii) obtaining additional directions of deviation for each component and the corresponding fixed output value and the additional directions of deviation to the listing of directions of deviation.

Obtaining the identifier using the set of directions of deviation and the difference may include: (i) treating the set of directions of deviation and the difference as the identifier, (ii) performing a lookup in an identifier lookup table using the set of directions of deviation and the difference as a key for the identifier lookup table to obtain an identifier associated with the inference, and/or (iii) may be obtained using any other method.

At operation 319, a type of anomaly is identified using the identifier and a first schema to identify a type of anomaly presented by the data.

In a first example, identifying the type of anomaly may include: (i) obtaining an anomaly lookup table, the anomaly lookup table comprising a listing of identifiers, and each identifier of the listing of identifiers being associated with a corresponding type of anomaly, and (ii) performing a lookup process using the anomaly lookup table and the identifier as a key for the anomaly lookup table to obtain the type of anomaly.

Obtaining the anomaly lookup table may include: (i) generating the anomaly lookup table, (ii) accessing the anomaly lookup table from storage, and/or (iii) requesting access to the anomaly lookup table from another entity.

Generating the anomaly lookup table may include: (i) obtaining a set of historical inferences that cover all (e.g., or a portion of) the potential types of anomalies in data obtained from a particular environment, (ii) obtaining the identifiers and the types of anomalies associated with each historical inference of the set of historical inferences (e.g., via consulting, for example, a subject matter expert), (iii) generating a listing of the identifiers associated with each historical inference and the corresponding types of anomalies for each historical inference, and (iv) treating the listing of identifiers and corresponding types of anomalies as the anomaly lookup table.

Performing the lookup process may include: (i) obtaining the identifier, (ii) inputting the identifier into the anomaly lookup table as a key for the anomaly lookup table, and (iii) obtaining an output from the anomaly lookup table, the output including the type of anomaly.

In a second example, identifying the type of anomaly may include: (i) obtaining a set of clusters, each cluster in the set of clusters being associated with: a historical inference, the historical inference being obtained prior to obtaining the inference and a type of anomaly, (ii) determining whether the inference falls within a cluster of the set of clusters, and/or (iii) if the inference falls within a cluster of the set of clusters, identifying the type of anomaly based on the cluster.

Obtaining the set of clusters may include: (i) performing a cluster analysis of a historical set of inferences to obtain the set of clusters, (ii) accessing the set of clusters from storage, and/or (iii) transmitting a request for access to the set of clusters to another entity hosting the set of clusters.

Performing the cluster analysis may include: (i) obtaining the historical set of inferences, and (ii) performing any type of cluster analysis (e.g., a density-based clustering of applications with noise process) to assign clusters using the historical set of inferences.

To determine whether the inference falls within the set of clusters, the inference may be compared to each cluster of the set of clusters. To compare the inference to each cluster of the set of clusters, a comparison may be made between the inference and a bounding area of a respective cluster to determine whether the inference falls within the respective cluster. The bounding area may be defined by a point and a radius that extends about the point thereby establishing the bounding area. The bounding area may be defined based on other parameters (e.g., to define non-circular shaped clusters) without departing from embodiments disclosed herein.

To compare the inference to the bounding area of a respective cluster, the inference may be superimposed on the graphical representation of the set of clusters. If the inference falls within a bounding area of a cluster, the inference may be considered to fall within the bounding area of the cluster. If the inference falls within the respective cluster, the inference may be considered as falling within the set of clusters.

Identifying the type of anomaly based on the cluster may include: (i) reading a label of the cluster that indicates the type of anomaly associated with the cluster, (ii) obtaining a cluster identifier (e.g., cluster A, cluster B, or the like) and performing a lookup in a cluster lookup table using the cluster identifier as a key for the cluster lookup table to obtain the type of anomaly associated with the cluster identifier, and/or (iii) other methods.

The method may end following operation 319.

Figure 3D:
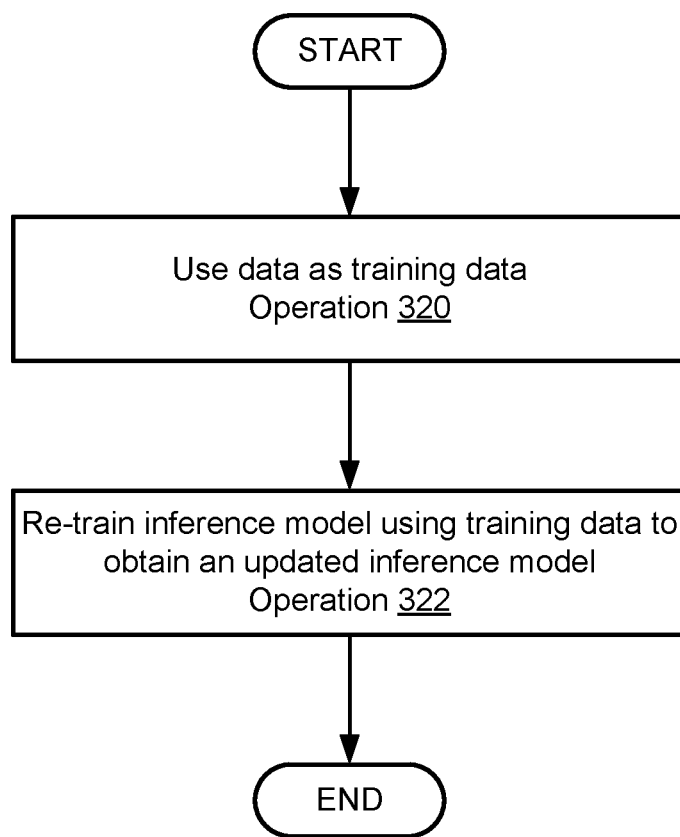
FIG. 3D shows a flow diagram illustrating a method of determining whether data is useful to improve an inference model through re-training in accordance with an embodiment.

Turning to FIG. 3D, a flow diagram illustrating a method of determining whether data is useful to improve an inference model through re-training in accordance with an embodiment is shown. The operations in FIG. 3D may be an expansion of operation 306 in FIG. 3A.

At operation 320, the data may be used as training data. The data may be used as training data by labeling it as training data for ingest into a training process for an inference model.

At operation 322, the inference model is re-trained to obtain an updated inference model. The inference model may be retrained using a partial re-training process. The partial re-training process may include freezing (e.g., rendering unaffected by the re-training process) a portion of the inference model. The frozen portion may be chosen randomly during each instance of re-training. The size of the frozen portion may be selected via any method (e.g., heuristically, deterministically based on characteristics of the inference model such as size, accuracy level, etc.). For example, the anomaly detector 102 may freeze a random 75% of the inference model during each re-training process. Therefore, only the portion of the inference model not included in the frozen portion (e.g., the remaining 25% in this example) may be modified during re-training of the inference model.

In an embodiment, the inference model is re-trained by (i) freezing some of the parameters of a neural network (e.g., weights of connections between neurons), (ii) establishing an objective function that optimizes for the machine learning model to output the data for a given input, and (iii) iteratively modifying the parameters that are not frozen until the objective function is optimized. The re-training may be performed via other methods depending on the type of inference model (e.g., other than a neural network) and/or other factors without departing from embodiments disclosed herein.

Re-training the inference model may generate an updated inference model. The updated inference model may be used in place of the inference model and no copies of the inference model may be retained on the anomaly detector 102. By doing so, storage resources may be freed (e.g., by not retaining old copies of inference models) and the most up-to-date version of the inference model may be the only version of the inference model available for use. Therefore, the anomaly detection capabilities of the inference model may be continuously improved by anomaly detector 102 during collection of data and detection of anomalies in the data.

The method may end following operation 322.

Turning to FIG. 4A, three examples are shown of input data being mapped to a single output value using a neural network inference model (neural network 402). In these examples, neural network 402 is trained to map non-anomalous input data to a set of fixed output values of [1, 1, 1]. Therefore, any non-anomalous data used as an ingest for neural network 402 will likely generate a multi-dimensional output of [1, 1, 1], or the close to [1, 1, 1] depending on how well the training data used to train the neural network inference model covers the full range of non-anomalous ingest data.

In a first example (the topmost section of FIG. 4A), input 400 includes non-anomalous data. The non-anomalous data is treated as the ingest for neural network 402 and output 404 of [1, 1, 1] is generated. Therefore, in this first example, neural network 402 operates as intended and classifies output 404 as non-anomalous data.

In a second example (the middle section of FIG. 4A), input 406 includes non-anomalous data. However, input 406 may include data never before seen by neural network 402 (during training or otherwise). Therefore, even though the input 406 includes non-anomalous data, the neural network 402 generates output 408 of [1, 1.1, 0.9]. As this output is not [1, 1, 1], an anomaly detector hosting the neural network 402 (not shown) may determine whether output 408 includes an anomaly. To do so, the anomaly detector may generate an anomaly level for output 408 and compare the anomaly level to a series of thresholds. The anomaly level for output 408 may be 2. A first threshold may be an anomaly level threshold dictating that any anomaly level over 5 indicates an anomaly. As the anomaly level of output 408 is not over 5, the anomaly detector may determine that output 408 does not include an anomaly. However, the anomaly detector may compare the anomaly level of output 408 to a second threshold (a calibration threshold). The calibration threshold may dictate that any anomaly level between 1 and 2 may include non-anomalous data unknown to neural network 402. The anomaly detector may consider anomaly levels between 0 and 1 as non-anomalous in accordance with the current training of the neural network 402. An anomaly level outside the calibration threshold (but within the anomaly level threshold) may include data useful for re-training of neural network 402 (in order to train neural network 402 to recognize non-anomalous data in potentially new situations and/or environments). Therefore, the anomaly detector may choose to re-train neural network 402 using data included in input 406.

In a third example (the lowest section of FIG. 4A), input 410 includes anomalous data. The anomalous data is treated as the ingest for neural network 402 and output 412 of [3, −0.2, −1.6] is generated. The anomaly detector may generate an anomaly level for output 412 of 7, compare the anomaly level of output 412 to the anomaly level threshold and may determine that output 412 contains anomalous data (e.g., via being outside the anomaly level threshold of 5). The anomaly detector may further classify the type of anomaly present in input 410, may perform an action set based on the anomalous data, may inform a downstream consumer of the anomalous data, and/or may perform other actions as needed to address the presence of anomalous data in input 410.

Figure 4B:
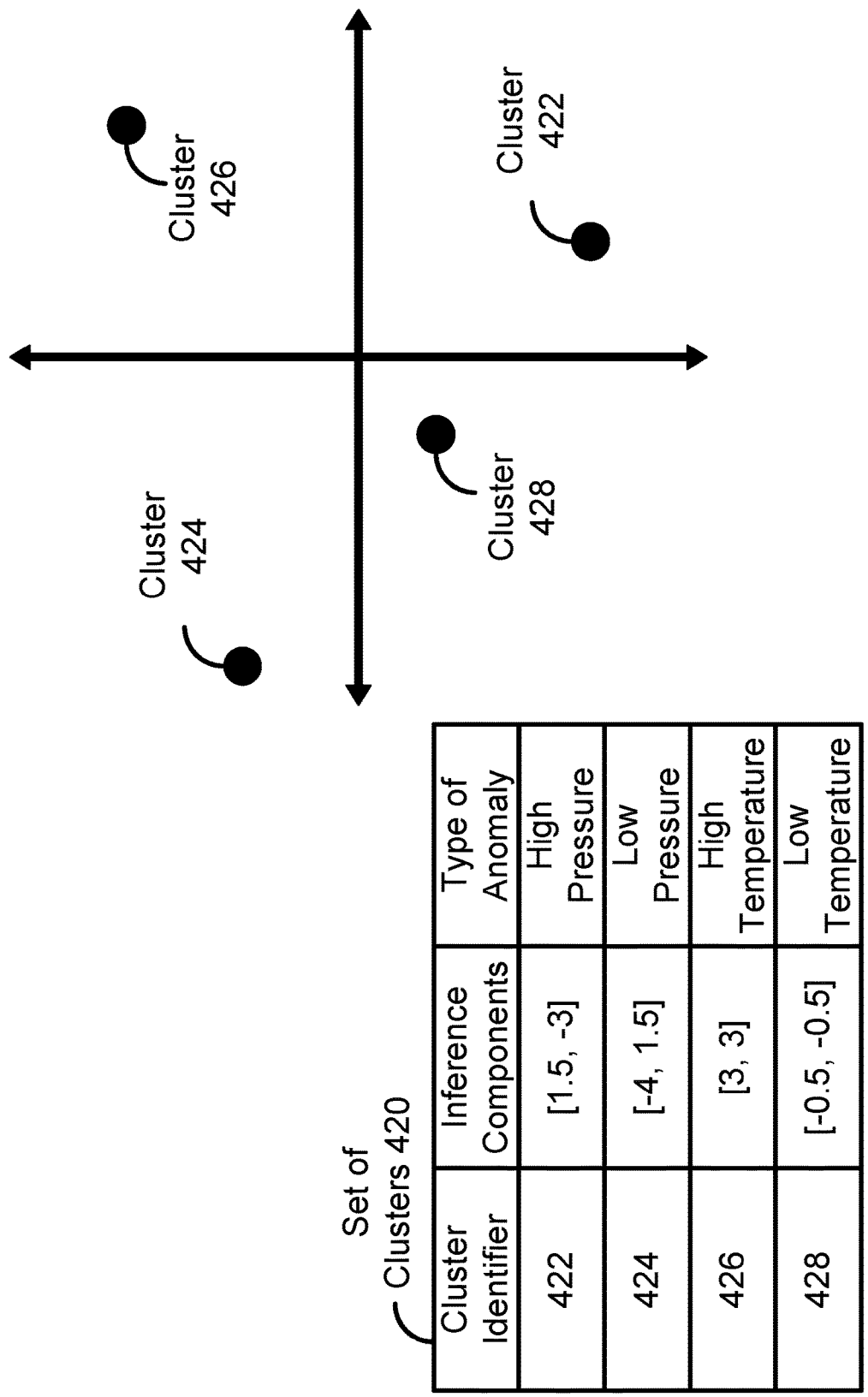
FIGS. 4B-4C show diagrams illustrating a method of identifying a type of anomaly over time in accordance with an embodiment.
Figure 4C:
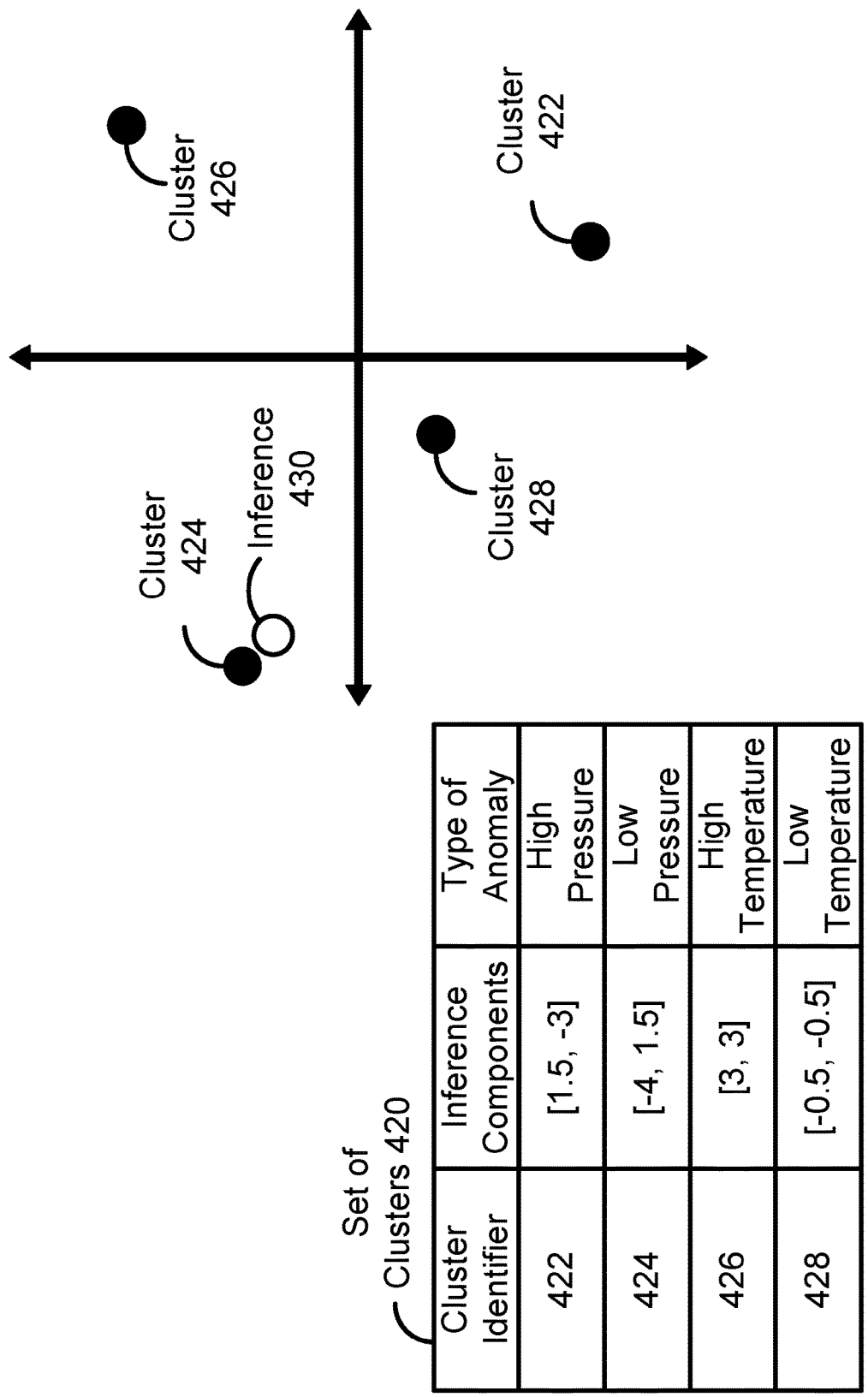

To further clarify embodiments disclosed herein, an example implementation in accordance with an embodiment is shown in FIGS. 4B-4C. These figures show diagrams illustrating memory-less anomaly detection while protecting data in a distributed environment subject to attack by malicious attackers and continuously updating inference models usable for anomaly detection. FIGS. 4B-4C may show examples of processes for assigning a type of anomaly and performing an action set based on the type of anomaly to support an industrial environment. While described with respect to an industrial environment, it will be understood that embodiments disclosed herein are broadly applicable to different use cases as well as different types of data processing systems than those described below.

Turning to FIG. 4B, consider a scenario in which temperature and pressure data are obtained from an industrial environment to help monitor conditions related to a chemical synthesis process. To perform anomaly detection while determining the type of anomaly present (e.g., a high temperature anomaly, a high pressure anomaly, a low temperature anomaly, a low pressure anomaly, etc.), set of clusters 420 may be obtained. Set of clusters 420 may be based on a historical set of data including multi-dimensional inferences generated by an inference model and corresponding types of anomalies. The multi-dimensional inferences may each include two components and each cluster may have a cluster identifier as shown in set of clusters 420.

For example, a first cluster may correspond to an inference with a cluster identifier of 422, inference components of [1.5, −3], and a type of anomaly of high pressure. Therefore, any inference similar to cluster 422 (within some threshold for identifying the boundary of cluster 422) may indicate a high pressure anomaly in data obtained from the industrial environment.

As shown in FIG. 4B, cluster 422, cluster 424, cluster 426, and cluster 428 are displayed as a graphical representation of set of clusters 420. Turning to FIG. 4C, inference 430 is superimposed on the graphical representation of set of clusters 420 to determine the type of anomaly indicated by inference 430. Inference 430 may previously have been identified as indicating the presence of anomalous data via a comparison of the components of inference 430 to a set of fixed output values (e.g., the set of fixed output values being the output of the inference model when the data is non-anomalous). For example, inference 430 may include the components [−3.6, 1.2] and the set of fixed output values may be [1, 1]. The components of inference 430 may be considered different enough from the set of fixed output values to indicate the presence of an anomaly.

As shown in FIG. 4C, inference 430 may be positioned proximate to cluster 424. A cluster analysis may be performed to determine whether inference 430 falls within cluster 424. The cluster analysis may determine that inference 430 does reside within cluster 424 and, therefore, inference 430 may indicate the presence of a low pressure anomaly in the data obtained from monitoring the industrial environment. A notification of the low-pressure anomaly and/or other data (e.g., an indication of the level of criticality of the anomaly, etc.) may be transmitted to a downstream consumer, an action set may be performed in response to the anomaly, and/or other actions may be taken in order to remediate the impact of the low-pressure anomaly.

Figure 5:
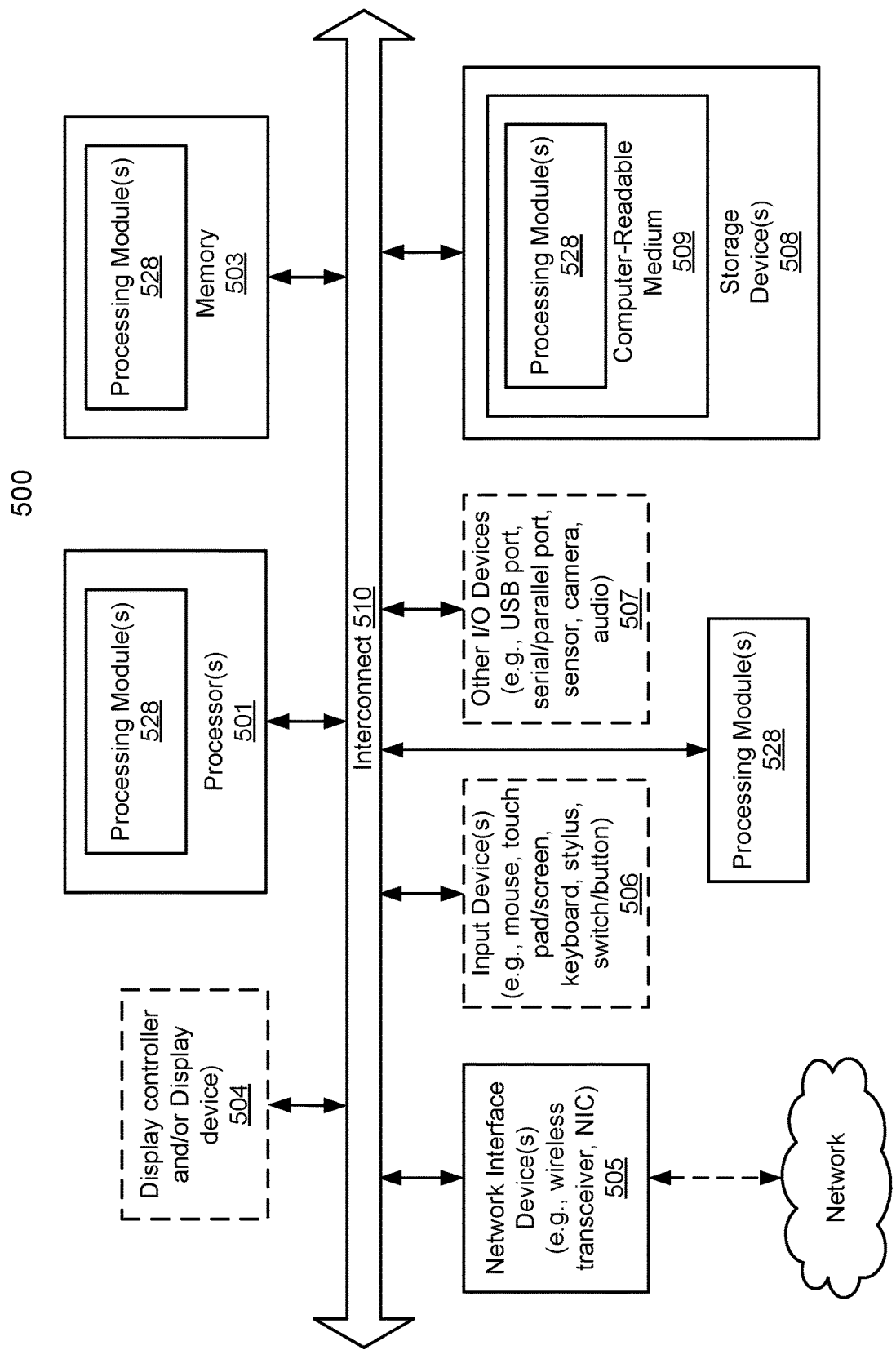
FIG. 5 shows a block diagram illustrating a data processing system in accordance with an embodiment.

Any of the components illustrated in FIGS. 1-4C may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of processing data, the method comprising:
obtaining an inference using an inference model and data obtained from a data collector, the inference being intended to match a set of fixed output values when the data is non-anomalous, and the inference comprising at least one dimension;
making a first determination, based on the inference, an anomaly level threshold, and a difference between a set of components of the inference and the set of fixed output values, regarding whether the data comprises anomalous data;
in a first instance of the first determination in which the data comprises anomalous data:
classifying the inference using a first schema to identify a type of anomaly presented by the data; and
performing an action set based on the type of anomaly to manage a potential impact of an occurrence of the type of anomaly.

2. The method of claim 1, wherein making the first determination comprises:
obtaining a set of components of the inference, the set of components being based on the at least one dimension;
obtaining an anomaly level of the data using the set of components and the set of fixed output values;
making a second determination regarding whether the anomaly level exceeds the anomaly level threshold; and
in a first instance of the second determination in which the anomaly level exceeds the anomaly level threshold:
identifying the data as anomalous data.

3. The method of claim 2, wherein obtaining the anomaly level comprises:

obtaining a difference, the difference being based on the set of components and the set of fixed output values; and assigning the anomaly level of the data based on a magnitude of the difference and a second schema for identifying a degree of anomalousness of the data.

4. The method of claim 3, wherein obtaining the difference comprises:
obtaining a first magnitude of a first component of the set of components;
obtaining a set of magnitudes, the set of magnitudes comprising the first magnitude;
obtaining a first fixed output value of the set of fixed output values, the first fixed output value corresponding to the first component;
obtaining a first difference using the first fixed output value and the first component;
obtaining a set of differences, the set of differences comprising the first difference; and
treating the set of differences as the difference.

5. The method of claim 4, wherein classifying the inference comprises:
obtaining an identifier using the set of components; and
identifying, using the first schema and the identifier, the type of anomaly.

6. The method of claim 5, wherein obtaining the identifier comprises:
obtaining a first direction of deviation based on the first fixed output value and the first component;
obtaining a set of directions of deviation using, at least in part, the first direction of deviation; and
obtaining the identifier using the set of directions of deviation and the difference.

7. The method of claim 5, wherein identifying the type of anomaly comprises:
obtaining an anomaly lookup table, the anomaly lookup table comprising a listing of identifiers, and each identifier of the listing of identifiers being associated with a corresponding type of anomaly; and
performing a lookup process using the anomaly lookup table and the identifier as a key for the anomaly lookup table to obtain the type of anomaly.

8. The method of claim 5, wherein identifying the type of anomaly comprises:
obtaining a set of clusters, each cluster in the set of clusters being associated with:
a historical inference, the historical inference being obtained prior to obtaining the inference; and
a type of anomaly;
making a third determination regarding whether the inference falls within a cluster of the set of clusters; and
in a first instance of the third determination in which the inference falls within a cluster of the set of clusters:
identifying the type of anomaly based on the cluster.

9. The method of claim 1, wherein performing the action set comprises one selected from a group of actions consisting of:
notifying a downstream consumer of the type of anomaly;
initiating a process keyed to the type of anomaly; and
logging the type of anomaly in storage.

10. The method of claim 1, wherein making the first determination is also based on an anomaly level for the data, the anomaly level being based on:
a difference between a set of components of the inference and the set of fixed output values.

11. A non-transitory machine-readable medium having instructions stored therein, which when executed by a processor, cause the processor to perform operations for processing data, the operations comprising:
obtaining an inference using an inference model and data obtained from a data collector, the inference being intended to match a set of fixed output values when the data is non-anomalous, and the inference comprising at least one dimension;
making a first determination, based on the inference, an anomaly level threshold, and a difference between a set of components of the inference and the set of fixed output values, regarding whether the data comprises anomalous data;
in a first instance of the first determination in which the data comprises anomalous data:
classifying the inference using a first schema to identify a type of anomaly presented by the data; and
performing an action set based on the type of anomaly to manage a potential impact of an occurrence of the type of anomaly.

12. The non-transitory machine-readable medium of claim 11, wherein making the first determination comprises:
obtaining a set of components of the inference, the set of components being based on the at least one dimension;
obtaining an anomaly level of the data using the set of components and the set of fixed output values;
making a second determination regarding whether the anomaly level exceeds the anomaly level threshold; and
in a first instance of the second determination in which the anomaly level exceeds the anomaly level threshold:
identifying the data as anomalous data.

13. The non-transitory machine-readable medium of claim 12, wherein obtaining the anomaly level comprises:
obtaining a difference, the difference being based on the set of components and the set of fixed output values; and
assigning the anomaly level of the data based on a magnitude of the difference and a second schema for identifying a degree of anomalousness of the data.

14. The non-transitory machine-readable medium of claim 13, wherein obtaining the difference comprises:
obtaining a first magnitude of a first component of the set of components;
obtaining a set of magnitudes, the set of magnitudes comprising the first magnitude;
obtaining a first fixed output value of the set of fixed output values, the first fixed output value corresponding to the first component;
obtaining a first difference using the first fixed output value and the first component;
obtaining a set of differences, the set of differences comprising the first difference; and
treating the set of differences as the difference.

15. The non-transitory machine-readable medium of claim 14, wherein classifying the inference comprises:
obtaining an identifier using the set of components; and
identifying, using the first schema and the identifier, the type of anomaly.

16. The non-transitory machine-readable medium of claim 15, wherein obtaining the identifier comprises:
obtaining a first direction of deviation based on the first fixed output value and the first component;
obtaining a set of directions of deviation using, at least in part, the first direction of deviation; and
obtaining the identifier using the set of directions of deviation and the difference.

17. A data processing system, comprising:
a processor; and
a memory coupled to the processor to store instructions, which when executed by the processor, cause the processor to perform operations for processing data, the operations comprising:
  obtaining an inference using an inference model and data obtained from a data collector, the inference being intended to match a set of fixed output values when the data is non-anomalous, and the inference comprising at least one dimension;
  making a first determination, based on the inference, an anomaly level threshold, and a difference between a set of components of the inference and the set of fixed output values, regarding whether the data comprises anomalous data;
  in a first instance of the first determination in which the data comprises anomalous data:
    classifying the inference using a first schema to identify a type of anomaly presented by the data; and
    performing an action set based on the type of anomaly to manage a potential impact of an occurrence of the type of anomaly.

18. The data processing system of claim 17, wherein making the first determination comprises:
  obtaining a set of components of the inference, the set of components being based on the at least one dimension;
  obtaining an anomaly level of the data using the set of components and the set of fixed output values;
  making a second determination regarding whether the anomaly level exceeds the anomaly level threshold; and
  in a first instance of the second determination in which the anomaly level exceeds the anomaly level threshold:
    identifying the data as anomalous data.

19. The data processing system of claim 18, wherein obtaining the anomaly level comprises:
  obtaining a difference, the difference being based on the set of components and the set of fixed output values; and
  assigning the anomaly level of the data based on a magnitude of the difference and a second schema for identifying a degree of anomalousness of the data.

20. The data processing system of claim 19, wherein obtaining the difference comprises:
  obtaining a first magnitude of a first component of the set of components;
  obtaining a set of magnitudes, the set of magnitudes comprising the first magnitude;
  obtaining a first fixed output value of the set of fixed output values, the first fixed output value corresponding to the first component;
  obtaining a first difference using the first fixed output value and the first component;
  obtaining a set of differences, the set of differences comprising the first difference; and
  treating the set of differences as the difference.

* * * * *